United States Patent [19]
Nishimura et al.

[11] Patent Number: 5,184,244
[45] Date of Patent: Feb. 2, 1993

[54] OPTICAL COMMUNICATION SYSTEM AND COMMUNICATION METHOD

[75] Inventors: Akira Nishimura; Shuzo Suzuki; Masayuki Shigematsu, all of Kanagawa, Japan

[73] Assignee: Sumitomo Electric Industries, Ltd., Osaka, Japan

[21] Appl. No.: 771,838

[22] Filed: Oct. 8, 1991

Related U.S. Application Data

[63] Continuation of Ser. No. 440,247, Nov. 22, 1989, abandoned.

[30] Foreign Application Priority Data

Nov. 25, 1988 [JP] Japan .................. 63-297486
Dec. 23, 1988 [JP] Japan .................. 63-325490

[51] Int. Cl.⁵ ............................................ H04B 10/04
[52] U.S. Cl. ................................. 359/187; 359/188
[58] Field of Search ............... 359/187, 188, 180, 181, 359/154, 161, 173; 372/29, 31, 33

[56] References Cited

U.S. PATENT DOCUMENTS 4,583,228 4/1986 Brown et al. ..................... 372/32

FOREIGN PATENT DOCUMENTS 0037857 10/1981 European Pat. Off. ............ 455/610
0048640 3/1982 European Pat. Off.
57-174949 10/1982 Japan .
0008625 1/1987 Japan .................................. 455/618

OTHER PUBLICATIONS

Smith, DW, "Laser Level-Control Circuit For High--Bit-Rate Systems Using a Slope Detector," Electronics Letters, Nov. 23, 1978, vol. 14, No. 24, pp. 775-776.
Patterson et al, "Linearization of Multichannel Analog Optical Transmitters by Quasi-Feedforward Compensation Technique," IEEE Transactions on Communications, vol. COM-27, No. 3, Mar. 1979, pp. 582-588.
Frankart et al, "Analog Transmission of TV-Channels on Optical Fibers, With Non-Linearities Correction By Regulated Feedforward", Proceedings of the 9th European Conference on Optical Communication—ECOC 1983, Oct. 26, 1983, pp. 298-304.
Frankart, et al., "Analog Transmission of TV-Channels on Optical Fibers, With Non-Linearities Correction By Regulated Feedforward", cover page, pp. 299-304.

Primary Examiner—Edward L. Coles, Sr.
Assistant Examiner—Kinfe Michael Negash
Attorney, Agent, or Firm—Cushman, Darby & Cushman

[57] ABSTRACT

An optical communication arrangement (apparatus and method) employing intensity modulation. The parameters of the optical communication system that impose a maximum influence on the modulation distortion are monitored whenever necessary, and the operating parameters of the optical communication system can be corrected in accordance with the parameters being monitored. The system employs the intensity modulation in which a delaying mechanism having a low delay accuracy and a delaying mechanism having a high delay accuracy are provided to completely suppress the modulation distortion.

8 Claims, 6 Drawing Sheets

TABLE

| CHARACTERISTIC PARAMETERS | | ALLOWABLE RANGE (%) OF VARIATION | FEASIBILITY |
|---|---|---|---|
| MAIN SEMICONDUCTOR LASER | $p_1$ | ±25 | FEASIBLE |
| | $q_1$ | ±30 | FEASIBLE |
| | $I_{th1}$ | ±30 | FEASIBLE |
| CORRECTION SEMICONDUCTOR LASER | $p_2$ | ±3 | SOME PROBLEM |
| | $q_2$ | ±30 | FEASIBLE |
| | $I_{th2}$ | ±30 | FEASIBLE |
| 1ST LIGHT REC. ELEMENT | $r_1$ | ±3 | FEASIBLE |
| 2ND LIGHT REC. ELEMENT | $r_2$ | ±3 | FEASIBLE |
| 3RD LIGHT REC. ELEMENT | $r_3$ | ±3 | FEASIBLE |

| PARAMETERS | RANGE WHERE MOD. DIST. CAN BE 15dB LESS THAN WHEN FEED FORWARD IS NOT APPLIED. |
|---|---|
| SHIFT IN DELAY TIME SETTING AT DELAYING MECHANISM 106  $\Delta \tau_1$ | WITHIN ±130 PSEC |
| SHIFT IN DELAY TIME SETTING AT DELAYING MECHANISM 116  $\Delta \tau_2$ | WITHIN ±8 PSEC |

OPTICAL COMMUNICATION SYSTEM AND COMMUNICATION METHOD

This is a continuation of application Ser. No. 07/440,247, filed on Nov. 22, 1989, which was abandoned upon the filing hereof.

BACKGROUND OF THE INVENTION

1. Field of the Invention

The present invention relates in general to optical communication. More particularly, the invention is directed to an optical communication system and an optical communication method. An optical signal is directly intensity-modulated by an analog signal and is transmitted through an optical communication means wherein the modulation distortion of signals being communicated is reduced by application of feedforward control.

2. Description of the Prior Art

With the development of optical fiber communication networks optical cable television (hereinafter CATV), wherein audio/video information is transmitted through an optical fiber instead of a coaxial cable, has been proposed. Using optical fibers permits transmission of an increased amount of information, enabling a large number of additional transmission channels as well as extended transmission distances.

Known transmission systems for optical CATV include a wideband frequency modulation method (hereinafter FM) and a vestigial sideband amplitude modulation system (hereinafter VSB/AM). An FM system is advantageous in that signal-to-noise ratio is large and intermodulation distortion is small, but requires an AM/FM converter for converting an electrical amplitude-modulated signal (hereinafter AM signal) into a frequency-modulated signal (hereinafter FM signal) when injecting the optical signal into the optical fiber as well as an FM/AM converter for converting the optical FM signal received over the optical fiber into the electrical AM signal. This necessarily gives rise to the overall high cost of the communication system. Conversely, VSB/AM system requires no converters as discussed above, thereby allowing both an inexpensive and simple construction of the communication system. With the VSB/AM system, the current injected into a light emitting element, for example, a semiconductor laser is directly modulated to produce the optical signal. However, the VSB/AM system suffers from a problem that the light output contains high order distortions that result in a poor CN (carrire-to-noise) ratio (equivalent to SNR, signal-to-noise ratio) since the injected current versus light output characteristic of the light emitting element such as the semiconductor laser is non-linear.

The amount of light output does not increase in proportion to the amount of current injected into the semiconductor but will contain the modulation distortion components proportional to the square of the injected current. Therefore, when transmitting information using a carrier frequency $f_1$, if the frequency components of $2f_1$, $3f_2$, $f_1+f_2$, $2f_1-f_2$, and so on are developed and these frequencies exist in the proximity of other frequencies, the modulation distortion components become a noise source for the other carrier frequencies to degrade the CN ratio thereof. Thus the following relation applies to transmitting picture information.

$$10\text{-log}_{10} \text{ (amplitude of carrier/amplitude of modulation distortion)} \geq 58 \text{ (dB)} \quad (1)$$

According to this relation, it is necessary to restrict the number of channels for transmission. Two ways of preventing deterioration of CN ratio were known; one in which the semiconductor laser as a light source is biased by a constant current and the light developed is externally modulated using an amplitude modulator that exhibits a linear modulation characteristic, the other in which so-called light feedforward (hereinafter FF) discussed in the paper "ANALOG TRANSMISSION OF TV-CHANNELS ON OPTICAL FIBER WITH NON-LINEARITIES CORRECTION BY REGULATED FEEDFORWARD" by J.P. FRANKART et al. REV. H.F. ELECTRON TELECOMMUNICATION, VOL. 12, Nov. 9, 1984. In the feedforward system, the electrical signal to be transmitted is applied to the semiconductor laser. Part of the main optical signal through the semiconductor laser is compared with the original electrical signal to obtain a corresponding correction signal. Then, the modulation distortion produced in the semiconductor laser is suppressed by adding the correction signal thus obtained to the main optical signal to perform so-called feedforward control thereof.

It is theoretically possible to greatly reduce the modulation distortion if the aforementioned feedforward system is constructed as described. However, deterioration with age and environmental changes cause alterations in the light emitting characteristics of the light emitting means such as the semiconductor laser, especially the slope efficiency (coefficients of the first order terms of a function of the input current and the light output). In such cases, with the aforementioned light feedforward method, operating parameters that have been initially set to an ideal condition may deviate from that condition due to the changes in the characteristics, thereby increasing the modulation distortion. Conventionally, no practical measures have been taken against changes in the parameters of the light communication system due to such environmental changes, as it has not been possible to sufficiently suppress the modulation distortion.

In the feedforward system, since signal propagation time depends on transmission paths of the respective signals and signal processing mechanisms inserted therein, the difference in the signal propagation time should be taken into consideration. One problem which has been encountered in connection with the aforementioned light feedforward system where the correction signal is added to the main signal in order to eliminate the distortion modulation, is that signal delay due to such difference in signal propagation time causes insufficient suppression of the modulation distortion components or even may increase the distortion.

Therefore, in the light feedforward system, an electrical delay circuit is provided at a stage immediately before the signals are added together to thereby adjust the propagation time relative to each other. However, no investigation has been carried out for the signal delay, especially the range of delay and the accuracy of delay. For this reason, the modulation distortion could not be suppressed adequately.

Moreover, the signal delay is adjusted at the receiving end, requiring a large construction of the receiving station. The miniaturization of the receiving station has been difficult.

SUMMARY OF THE INVENTION

For overcoming the aforementioned drawbacks, an object of the present invention is to provide a light communication system and a light communication method employing the intensity modulation in which the parameters in the light communication system that imposes a maximum influence on the modulation distortion are monitored whenever necessary, and the operating parameters of the light communication system can be corrected in accordance with the parameters being monitored.

Another object of the invention is to provide an optical communication system employing the intensity modulation in which a delaying mechanism having a low delay accuracy and a delaying mechanism having a high delay accuracy are provided to completely suppress the modulation distortion.

To achieve the first object of the invention, the present invention provides an optical communication system for transmitting an optical signal directly intensity-modulated by an analog signal. The system comprises: a first branching means for branching the analog signal into a first signal and a second signal; a main light emitting means for intensity-modulating an optical signal with the first signal and outputting the modulated optical signal; a second branching means for branching the optical signal output from the main light emitting means into a first optical signal and a second optical signal; a first light receiving means for generating an electrical signal in accordance with the first optical signal; a second light receiving means for generating an electrical signal in accordance with the second optical signal; a comparison means for comparing the electrical signal from the first light receiving means and the electrical signal from said second electrical signal, and outputting a comparison electrical signal; an auxiliary light emitting means for emitting an optical signal in accordance with the comparison electrical signal from the comparison means; a third light receiving means for producing an electrical signal in accordance with the optical signal from the auxiliary light emitting means; a superimposing means for superimposing the electrical signal from the second and third light receiving means; and an adjusting means for calculating parameters of an input/output characteristic of the auxiliary light emitting means to adjust operating parameters in the optical communication system.

Further, the system according to the present invention comprises: a first branching means for branching the analog signal into a first signal and a second signal; a main light emitting means for intensity-modulating an optical signal with the first signal and outputting the modulated optical signal; a second branching means for branching said optical signal output from said main light emitting means into a first optical signal and a second optical signal; a first light receiving means for generating an electrical signal in accordance with the first optical signal; a second light receiving means for superimposing the optical signals from the second optical signal and the optical signal from the auxiliary light emitting means, and generating an electrical signal in accordance with the second optical signal; a comparison means for comparing the electrical signal from the first light receiving means and the electrical signal from the second electrical signal, and outputting a comparison electrical signal; an auxiliary light emitting means for emitting a light in accordance with the comparison electrical signal from the comparison means; and an adjusting means for calculating parameters of an input/output characteristic of the auxiliary light emitting means to adjust operating parameters in the optical communication system.

The invention also provides an optical communication method. An analog signal is optically transmitted by directly intensity-modulating an optical signal using the analog signal. The method comprises the steps of: converting part of an optical signal, from a main light emitting means, that is intensity-modulated by a signal to be transmitted to an electrical signal; comparing the electrical signal with the signal to be transmitted and outputting a comparison result; intensity-modulating an optical signal with the comparison result and adding the optical signal intensity-modulated with the comparison result to part of the output of the main light emitting means; performing feedforward processing of the analog signal; and measuring characteristic parameters of a correction light emitting means whenever necessary, and updating operating parameters of the communication system whenever necessary on the basis of the characteristic parameters.

To achieve the aforementioned second object, there is provided an optical communication system for transmitting optical signals directly intensity-modulated by an analog signal. The system comprises: a first branching means for branching the analog signal into a first signal and a second signal; a main light emitting means for intensity-modulating an optical signal with the first signal and outputting the modulated optical signal; a second branching means for branching the optical signal output from the main light emitting means into a first optical signal and a second optical signal; an optical signal delaying mechanism connected to the second branching means for delaying the first optical signal to a first delay accuracy; a first light receiving means for generating an electrical signal in accordance with the second optical signal; a second light receiving means for generating an electrical signal in accordance with the optical signal from the optical signal delaying mechanism; a comparison means for comparing the electrical signal from the first light receiving means and the electrical signal from the second electrical signal, and outputting an comparison electrical signal; an auxiliary light emitting means for emitting an optical signal in accordance with the comparison electrical signal from the comparison means; a third light receiving means for producing an electrical signal in accordance with the optical signal from the auxiliary light emitting means; an electrical signal delaying mechanism for delaying the electrical signal for the second light receiving means to an accuracy higher than the first delay accuracy; a superimposing means for superimposing the electrical signals from the third light receiving means and the electrical signal delaying mechanism; wherein modulation distortion contained in the intensity-modulated optical signal being transmitted is suppressed.

The optical communication system and method, according to the invention, employ the optical feedforward system. Feedback control is carried out in which the input current versus optical output characteristic of the light emitting means for correction that affects the modulation distortion most seriously, is monitored to correct the parameters of the communication system in accordance with the change in the input current versus optical output characteristic, thereby minimizing influences of the changes in characteristic of the semiconductor laser due to the environmental changes and also deterioration with age.

The optical communication system employs the optical feedforward system and the signal delay having a high accuracy between the main signal and the correction signal is obtained by providing delaying mechanisms. One mechanism has a wide range of adjustment but has a low delay accuracy and the other has a narrow range of adjustment but has a high delay accuracy, thereby suppression of the modulation distortion is made possible.

BRIEF DESCRIPTION OF THE DRAWING

Other objects, features and characteristics of the present invention, as well as functions of the related elements of the structure, and to the combination of parts and the economics of manufacture, will become apparent upon consideration of the following description and the appended claims with reference to the accompanying drawings, all of which form a part of this specification.

DETAILED DESCRIPTION OF THE PRESENTLY PREFERRED EXEMPLARY EMBODIMENT

Embodiments of the invention will now be described with referenced to the drawings. Like elements having like numerals have similar functions and thus duplicated description has been omitted.

Figure 1:
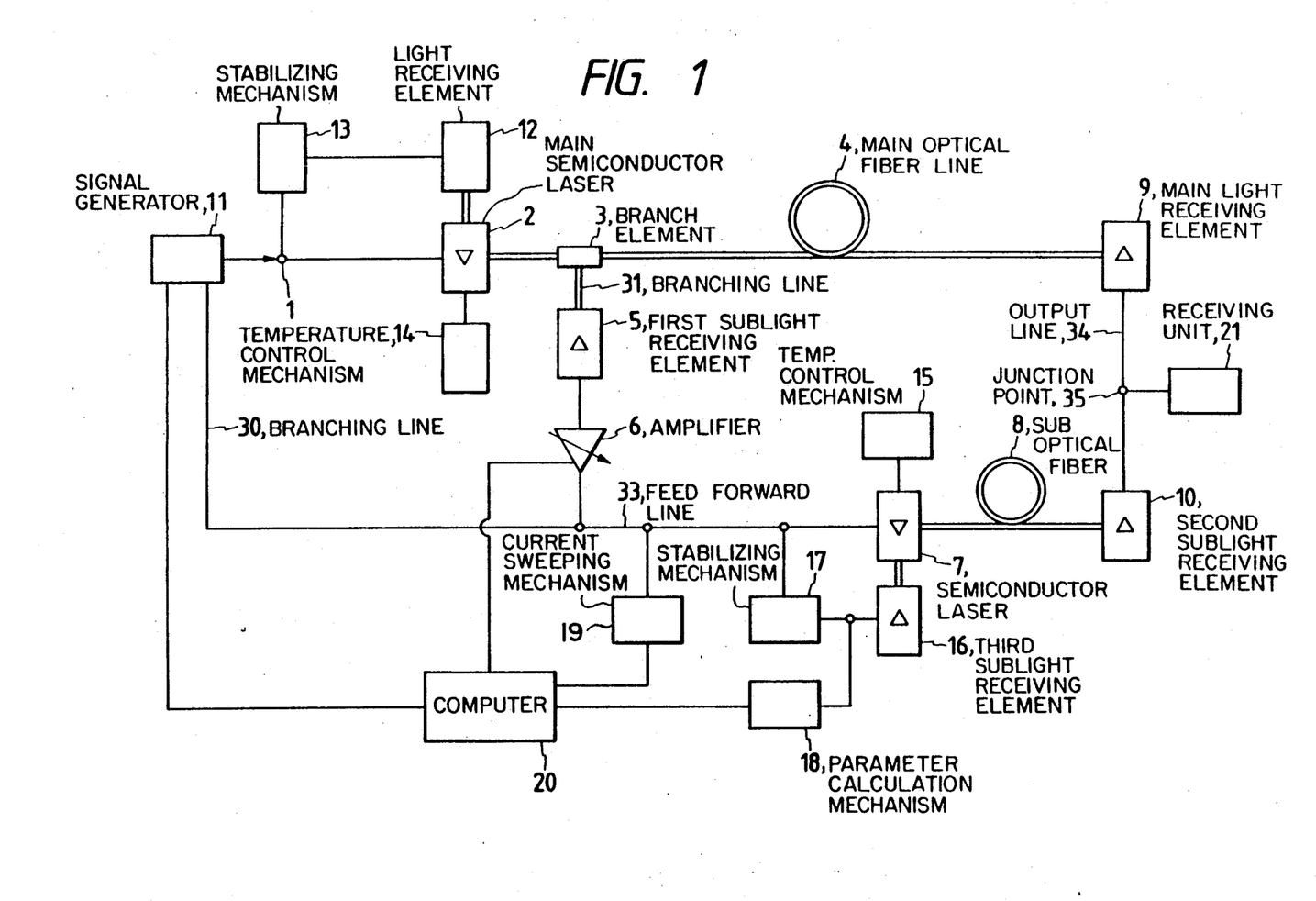
FIG. 1 is a schematic block diagram of a first embodiment of an optical communication system according to the present invention.

FIG. 1 shows a general construction of a first embodiment of an optical communication according to the present invention.

The optical communication system shown in FIG. 1 includes a main semiconductor laser 2 for directly intensity-modulating an optical signal by an analog signal to be transmitted, output from a signal generator 11, a main optical fiber line 4 for transmitting the intensity-modulated optical signal, and a main light receiving element 9 for demodulating the intensity-modulated optical signal into an electrical signal. The optical communication system is provided with a branching line 30 for branching part of the analog signal to be transmitted and a branching line 31 for branching part of the optical signal that is intensity-modulated by the semiconductor laser 2. The branching line 31 is provided with a branch element 3 for branching part of the optical signal, for example, half of the intensity-modulated optical signal, from the semiconductor laser 2 into the branching line 31 and the other half into the main optical fiber line 4.

Branching line 31 is connected to a first sublight receiving element 5 for demodulating the branched optical signal into an electrical signal, and an amplifier 6 for amplifying the demodulated signal by a predetermined amplification factor and then transmitting the amplified signal over the branching line 30. At a junction point of the branching line 30 and the branching line 31 a feedforward line 33 is connected that is provided with a subsemiconductor laser 7 for intensity-modulating the electrical signal into the optical signal. A suboptical fiber line 8 for transmitting the optical signal output from the subsemiconductor laser 7, and a second sublight receiving element 10 for demodulating the optical signal transmitted over the suboptical fiber line 8 into the electrical signal are attached to laser 7. The other end of the feedforward line 33 is connected to an output line 34 of the main light receiving element 9. A receiving unit 21 of the optical communication system of the first embodiment is connected to the junction point 35 of the output line 34 and the feedforward line 33.

The optical communication system is provided with a third sublight receiving element 16 which receives the light emitted from the subsemiconductor laser 7 and converts it into the electrical signal to measure the parameters such as the slope efficiency and the threshold current of the input current-optical output characteristic of the subsemiconductor laser 7. A current sweeping mechanism 19, capable of applying a sweeping current for inspection to the subsemiconductor laser 7, is provided off of line 33. Parameter calculation mechanism 18 for calculating parameters of the input current versus optical output characteristic is provided off of receiving element 16. The characteristic parameters of the subsemiconductor laser 7 are obtained by the parameter calculating mechanism 18 on the basis of the input current (sweeping current being applied) versus optical output (the output of the third sublight receiving element 16).

The optical communication system is provided with the signal generator 11 and a computer 20 for controlling the operating parameters of the optical communication system. For example, the amplification factor of the amplifier 6 is such that the aforementioned current sweeping mechanism 19 and the parameter calculating mechanism 18 are controlled by the signal generator 11 and the computer 20 so as to suppress the modulating distortion in accordance with the thus obtained parameters of the input current versus optical output characteristic of the subsemiconductor laser 7. That is, on the basis of the parameters obtained from the parameter calculating mechanism 18, a feedback control is performed for correcting the operating parameters of the optical communication system to suppress the modulation distortion. The calculation of the parameters and the feedback control based thereon are carried out whenever necessary, for example, with a predetermined time interval. The characteristics of a semiconductor laser generally vary with an ambient working temperature. For example, an InGaAsP Fabry-Perot semiconductor laser exhibits a change of 10% in the slope efficiency and a change of 30% in the threshold current when the ambient working temperature changes from 20° to 50° C. Thus temperature control mechanisms 14, 15, so-called automatic temperature control (ATC) circuits, are preferably connected to the main semiconductor laser 2 and the subsemiconductor laser 7, respectively, so that the temperature is maintained constant. Also, the characteristics of a semiconductor laser generally vary due to deterioration with age. For example, an InGaAsP Fabry-Perot semiconductor laser has been found to exhibit changes of more than 50% both in the slope efficiency and its threshold current over a ten-year use. Thus there is a possibility that the output of the semiconductor laser operating at a contrast current may possibly vary a lot. The optical communication is preferably provided with automatic power stabilizing mechanism 13, 17 or so-called automatic power control (APC) to stabilize the optical output so that the optical outputs from the rear surface of the main and subsemiconductor lasers are respectively monitored by a light receiving element 12 for monitoring and the third sublight receiving element 16 to thereby adjust the forward current for a constant optical output.

The principle of the aforementioned embodiment of the optical feedforward system has been discussed in detail in the previously mentioned documents.

The reason why the characteristic parameters of the subsemiconductor laser, in particular, are measured whenever necessary and the measurement is fed back to the optical feedforward control, will be described with references to FIG. 2-3.

Figure 2:
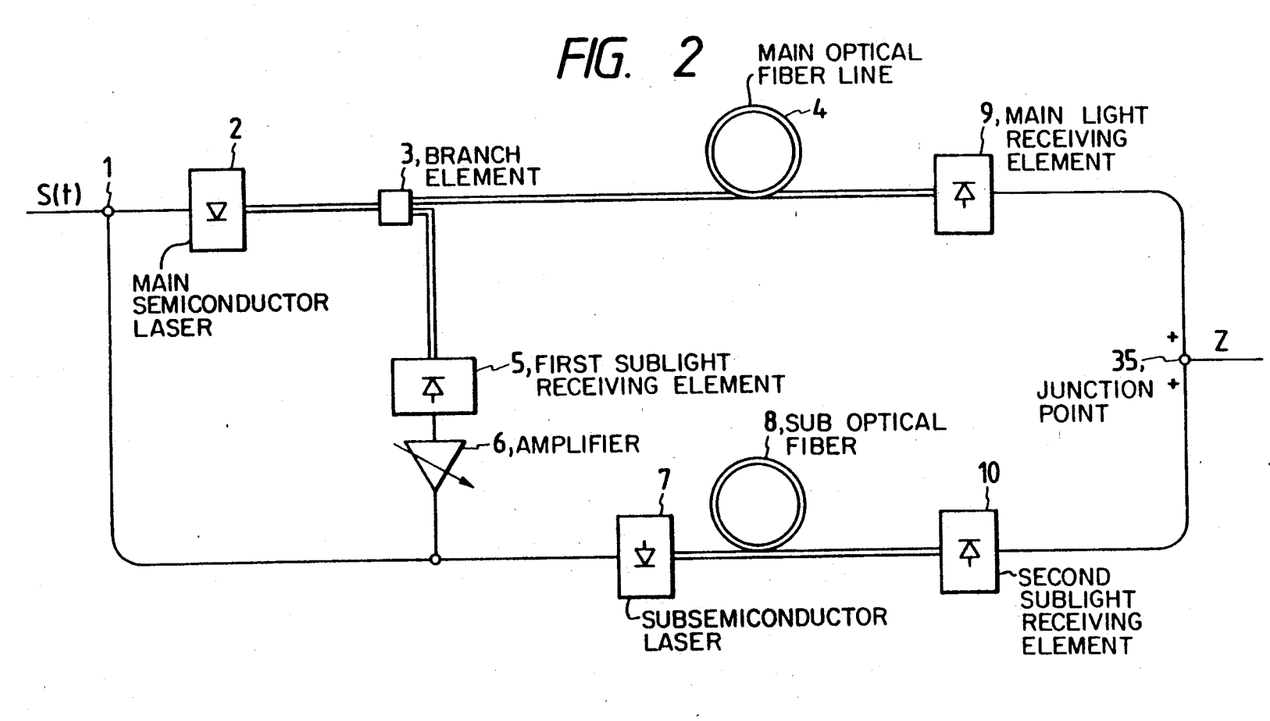
FIG. 2 is an illustrative diagram for discussing the principle of feedforward in the optical communication system shown in FIG. 1.
Figure 3:
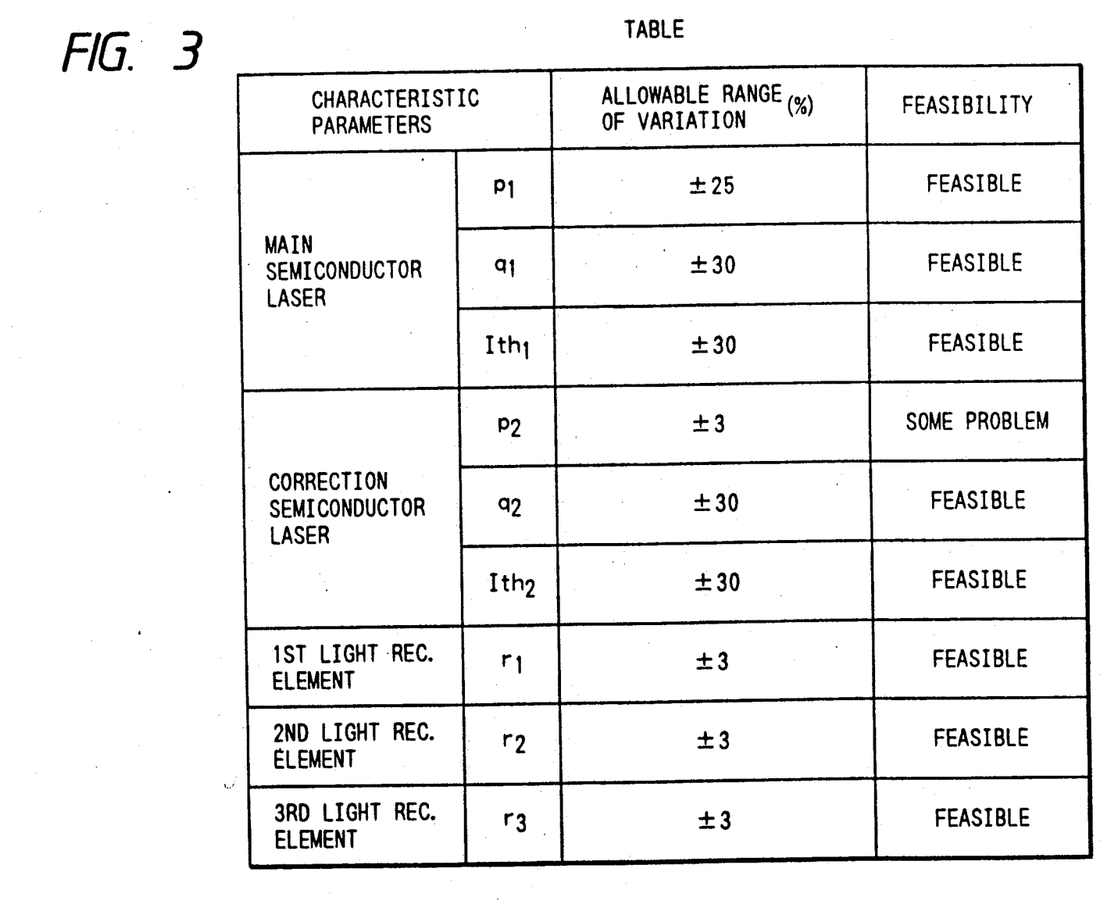
FIG. 3 illustrates a table for showing the influences of operating parameters of the respective structural elements on the modulation distortion in the optical communication system of FIG. 1.

FIG. 2 illustrates a model system for investigating the optical feedforward control. In FIG. 2, elements corresponding to elements in FIG. 1 have identical reference designations.

We assume that the relationship of input current x versus optical outputs $O_1(x)$ of the main semiconductor laser 2, and $O_2(x)$ of the subsemiconductor laser 7 as follows:

$$O_1(x) = P_1(x - Ith_1) - Q_1(x - Ith_1)^2$$

$$O_2(x) = P_2(x - Ith_2) - Q_2(x - Ith_2)^2$$

where $P_1$, $P_2$, $Q_1$, $Q_2$ are characteristic parameters and $Ith_1$ and $Ith_2$ are threshold currents.

Assuming that branch ratio of the branch element 3 is 1:1, the output Y's corresponding to the inputs to the main light receiving element 9, the first sublight receiving element 5, and the second sublight receiving element 10, are respectively, $$Y_1 = r_1 x$$

$$Y_2 = r_2 x$$

$$Y_3 = r_3 x$$

The amplification factor of the amplifier 6 is b, and the relationship of the output versus input x is expressed by $$W = bx$$

Further assuming that a current $I_1 + k_1(t)$ flows through the branching point 1 into the main semiconductor laser 2 side and a current $I_2 + k_2(t)$ into the branching line 30 side, the output Z at the junction point 35 is given as a function of S(t) as follows:

$$Z = Z(S(t)) \tag{2}$$

If b, $k_1$, and $k_2$ are selected values thereof such that the coefficients of the terms other than the first order terms of S(t), i.e., those of non-linear terms, are zeroes, then $$b = r_1/(P_2 X\ r_2 X\ r_3) \tag{3}$$

$$(k_2/k_1) = \{(\tfrac{1}{2})\ (P_1 X\ r_1)\}/(P_2 X\ r_3) \tag{4}$$

Thus the theory indicates that the modulation distortion can be suppressed by selecting the parameters as mentioned above.

However, calculating the influence of the variations of the respective parameters of the first and second subsemiconductor lasers to the output Z(S(t)) using Eqs. (1) and (2) after the parameters as shown by Eqs. (3) and (4) have been set, yield the results shown in FIG. 3. This table shows an allowable range of variation in which the modulation distortion can be suppressed 15 dB less than that in the case where the feedforward is not applied. As is seen from the table, the parameter that affects the modulation distortion most significantly is the slope efficiency of the subsemiconductor laser 7 which must be corrected taking the stabilities of the respective elements into consideration. Thus in the optical communication system, the characteristic parameters of the subsemiconductor laser are monitored whenever necessary and the operating parameters of the optical communication system, for example, the amplification factor of the amplifier is corrected to efficiently suppress the modulation distortion in accordance with the variation of the parameters.

For such parameter variations of the subsemiconductor laser 7, especially for the variation of the slope efficiency, the aforementioned automatic optical output control mechanisms 13, 17 etc. cannot modify the variations and the amplitude output of the output signal from the semiconductor laser, which remains uncorrected. The optical feedforward method, too, cannot suppress the modulation distortion due to the variation of the slope efficiency.

An optical communication system according to the aforementioned embodiment was manufactured as an experiment with the following specifications and was compared with a prior art optical communication system which employs the feedforward method.

The main semiconductor laser 2 was constructed of an InGaAsP Fabry-Perot semiconductor laser having an oscillation wavelength of 1308 nanometers and the subsemiconductor laser 7 was formed of an InGaAsP Fabry-Perot semiconductor laser having an oscillation wavelength of 1314 nanometers. An InGaAs-PIN photodiode was used for the main light receiving element 9, the first, second, and third sublight receiving elements 5, 10, 16, and the light receiving element 12. The optical fiber lines 4, 8 are formed Of a single mode optical fiber for 1.3 μm band having a 9 μm core diameter and a 125 μm clad diameter. The video carrier of Channel 40 (channel: 4-12, M5-M10, S24-S33) was synthesized as a transmission signal. A spectrum analyzer was connected with the receiving unit 21. In transmission experiments, the temperature controlling mechanism 15 was used for varying the temperature environment of the subsemiconductor laser 7 to adjust the optical output characteristic so as to simulate deterioration of the optical output characteristic with age. The deterioration of the semiconductor with age exhibits a tendency similar to the case when the environmental temperature is raised. Thus the model was not subjected to actual deterioration with age in the experiment but rather the deterioration was simulated by varying the environment temperature. In the experiment, the optical communication system of the aforementioned embodiment was simulated by carrying out the following steps.

In step 1, the temperature controlling mechanism 15 was used to set the environment temperature of the subsemiconductor laser 2 to 0° C. In step 2, the input current versus optical output characteristic of the subsemiconductor laser 7 was measured to calculate the characteristic parameters, for example, the slope efficiency, the threshold current and so on. In step 3, the previously described parameters $k_1$, $k_2$, and b were set on the basis of the characteristic parameters obtained in step 2. Then in step 4, a signal was actually transmitted to measure the modulation distortion thereof.

The above-described steps 1-4 were then carried out while varying the temperature environment of the subsemiconductor laser 7. The environment temperature was increased in steps, for example 25° C., 50° C., 70° C. so as to measure the modulation distortion at the respective temperatures.

Figure 4:
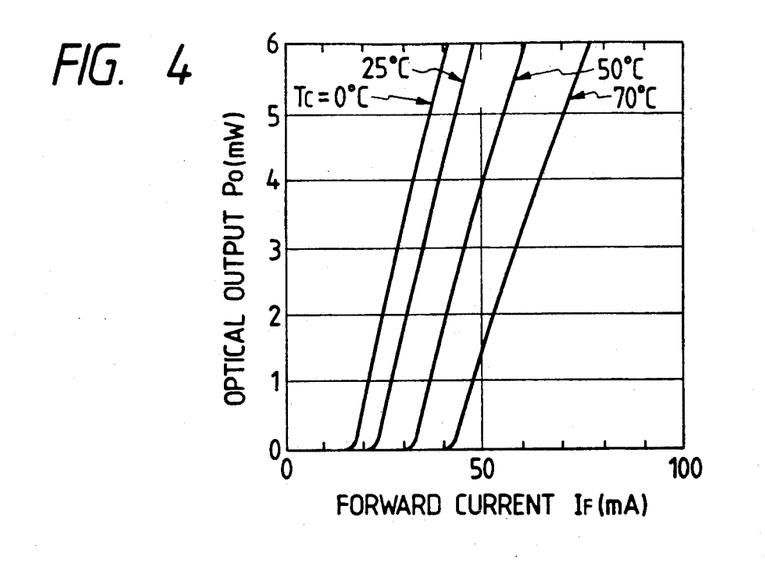
FIG. 4 is a diagram for showing the temperature dependency of the characteristics of a semiconductor laser.
Figure 5:
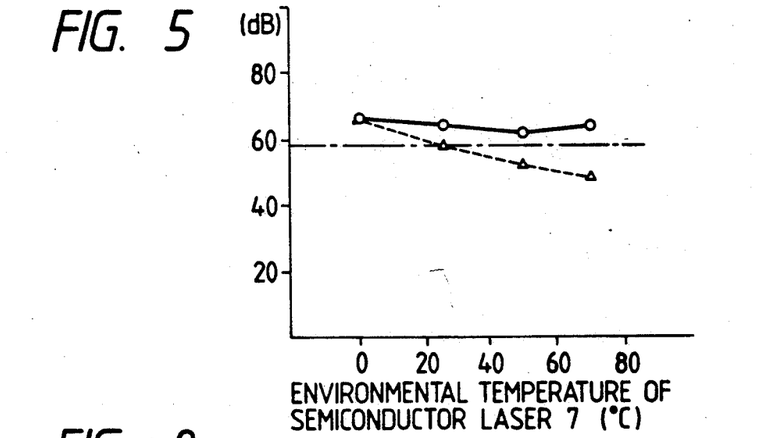
FIG. 5 is a diagram for explaining the effect of the optical communication system according to the present invention.

FIG. 4 shows temperature dependency of the input current versus optical output characteristic of the subsemiconductor laser 7 obtained in this manner. The solid line in FIG. 5 illustrates the values on the left-hand side of the Eq. (1) at the respective temperature. For the purpose of comparison, only step 4 was carried out for the conventional optical communication system and the values on the left-hand side of the Eq. (1) at that time are depicted by a dotted line in FIG. 5. A dashed line in FIG. 5 represents 58 dB, i.e., an allowable limit. As seen from FIG. 5, the optical communication system according to the invention was verified to be capable of suppressing the modulation distortion against changes in characteristics of the subsemiconductor laser 7 due to the deterioration with age.

In a practical optical communication system, the environment temperature of the semiconductor laser is controlled with precision primarily by the temperature controlling mechanisms 14, 15 and the deterioration with age causes a change in the input current versus optical output characteristic. However, the degradation with age is a rather gradual change, thus the input current versus optical output characteristic of the subsemiconductor laser 7 may be measured automatically at a predetermined internal time, for example, a weekly or a monthly measurement to again set the operating parameters of the optical communication system. Thereby the optical feedforward at an optimum condition may be performed at all times.

The above-described embodiment of the invention is only exemplary and various modification may be made.

Specifically, while the input current versus optical output characteristic of the subsemiconductor laser 7 is measured whenever necessary and the characteristic parameters obtained are fed back to the optical feedforward control, the input versus optical output characteristic may be fed back to the main semiconductor laser 2 as well.

While the main optical fiber line 4 and the suboptical fiber line 8 are separately provided, a single fiber line may be shared by the main and sublines by using an optical synthesizer and a branch element.

Although the optical signals issued from the main semiconductor laser 2 and the subsemiconductor laser 7 are transmitted over the optical fiber lines 4, 8, respectively, and the optical signals are converted into the electrical signals by the main light receiving element 9 and the second sublight receiving element 10, respectively, and are then synthesized later, these optical signals may be synthesized and then converted into the electrical signals by a single light receiving element rather than being transmitted separately.

Figure 6:
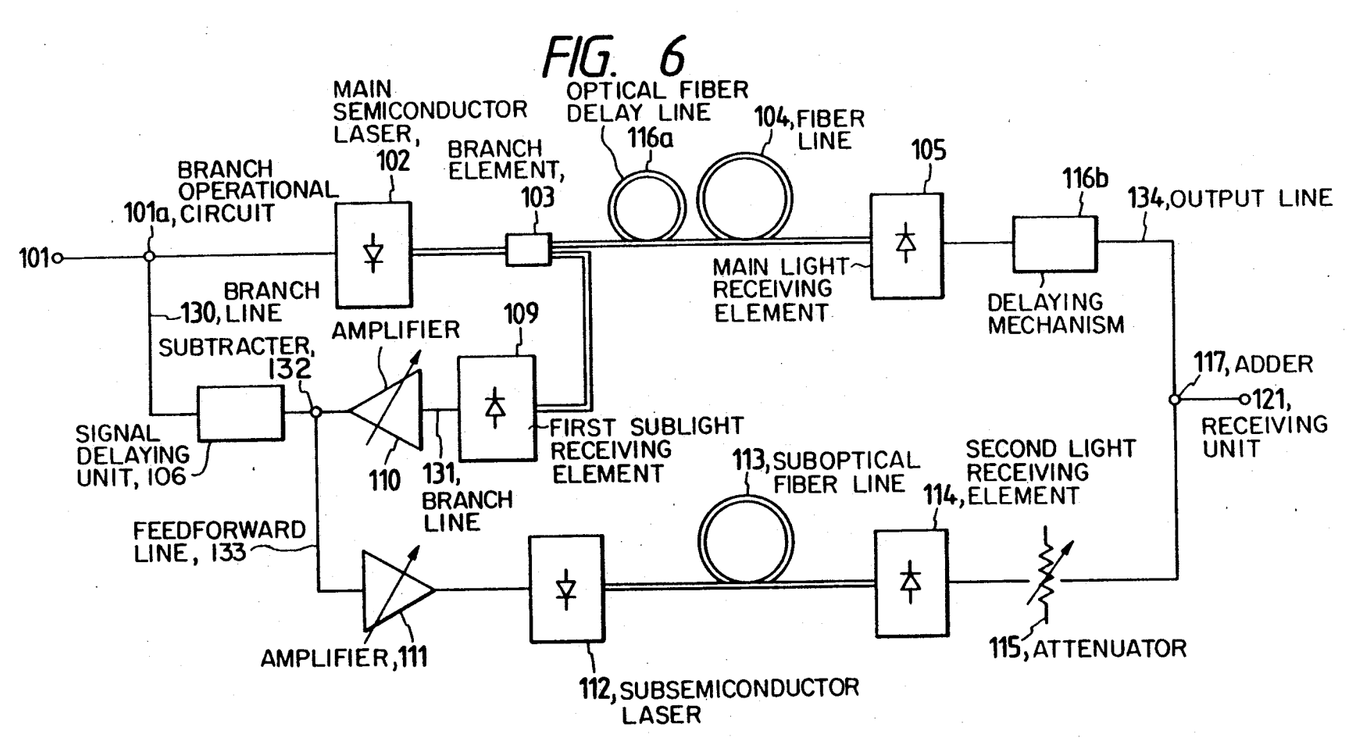
FIG. 6 is a schematic block diagram of a second embodiment.

FIG. 6 illustrates a general arrangement of a second embodiment of the present invention.

The optical communication system in FIG. 6 is made up of a main semiconductor laser 102 for directly intensity-modulating the optical signal by an analog signal to be transmitted which is input through an input port 101. An optical fiber delay line 116a having a predetermined length, enough for delaying the intensity-modulated optical signal by a predetermined length of time, is provided with line 104 before main light receiving element 105 which demodulates the intensity-modulated optical signal into an electrical signal. An electrical signal delaying mechanism 116b for delaying the electrical signal demodulated by the main light receiving element 105 is provided after main light receiving element 105. The optical fiber delay line 116a is arranged to have a delay accuracy of ±0.5 nanoseconds and a maximum adjustment range of 5-200 nanoseconds. Specifically, an optical fiber having a desired length is selected from a group of fibers in predetermined lengths, or an optical fiber is cut to a predetermined length, the fiber thus obtained is inserted into the system. The electrical signal delaying mechanism 116b is arranged by an electrical circuit to have a maximum adjustment range of 1-2 nanoseconds and an adjustment accuracy of ±0.5 picosecond. By this arrangement, the signal delaying mechanism 116a, 116b, which are different in the delay accuracy, are provided to improve the accuracy of delay time and also to ensure a wide range of adjustment. Generally, it is extremely difficult to form a delaying mechanism having a high delay accuracy over a wide range. Thus in the present invention, a coarse adjustment in a wide range is carried out by a mechanism having a low accuracy and a fine adjustment in a narrow range is performed by a mechanism having a high accuracy, thus implementing a delay mechanism having a high delay accuracy over a wide range.

The second embodiment is provided with a branch line 130 for branching part of the analog signal that is to be transmitted. The system further has a branch line 131 for branching part of the optical signal that has been intensity-modulated by the semiconductor laser 102. The branch line 131 is provided with a branch element 103 for branching part of the optical signal from the semiconductor laser 102, for example, half of the intensity-modulated optical signal into the branch 131 and another half into the main optical fiber line 104. A first sublight receiving element 109 for demodulating the branched optical signal into the electrical signal, and an amplifier 110 for amplifying the demodulated signal with a predetermined amplification factor and then transmitting the amplified signal to the previously described branch line 130 are provided along line 131. At the input terminal of the branch line 130 is provided a branch operational circuit 101a by which the input signal is branch-operated to be directed to the branch line 130. Further, on the part way of the branch line 130 is provided a signal delaying unit 106 for aligning phase with the signal being transmitted from the branch line 131. At the junction point of the branch line 130 and the branch line 131 is provided a subtractor 132 to take the difference between the signals from both the branch lines 130 and 131.

To the output terminal of the subtractor 132 is connected a feedforward line 133 to which an amplifier 111, for amplifying the electrical signal transmitted thereto, is connected. A subsemiconductor laser 112 for intensity-modulating the amplified electrical signal into the optical signal and suboptical fiber line 113 for transmitting the optical signal provided by the subsemiconductor laser 112, and a second light receiving element 114 for demodulating the optical signal transmitted over the suboptical fiber line 113 into the electrical signal are provided along line 133 after amplifier 111. An attenuator 115 is provided for adjusting the amplitude of the electrical signal demodulated by the second sublight receiving element 114.

On the other end of the feedforward line 133 is connected one of input terminals of an adder 117. To the other input terminal of the adder 117 is connected the output line 134 of the previously described electrical delay circuit 116. To the output terminal of the adder 117 is connected the receiving unit 121 of the optical communication system.

By this arrangement, when the modulation is performed by the main light emitting element 102, the modulation distortion contained in the intensity-modulated signal is eliminated with the aid of the correction signal transmitted over the suboptical fiber line 113.

If the phase of the correction signal is shifted from that of the main signal due to the delay of the signal, then the modulation distortion cannot be eliminated. Thus to eliminate such delay of the signal, a delaying mechanism having a high delay accuracy and a wide delay range needs to be constructed and inserted. In the second embodiment described above, two delaying mechanisms 116a, 116b are inserted to implement a highly accurate delay over a wide range.

The feedforward principle for the embodiment described has been discussed in the previously referred documents in detail, thus detailed illustration will not be presented here.

Figure 7:
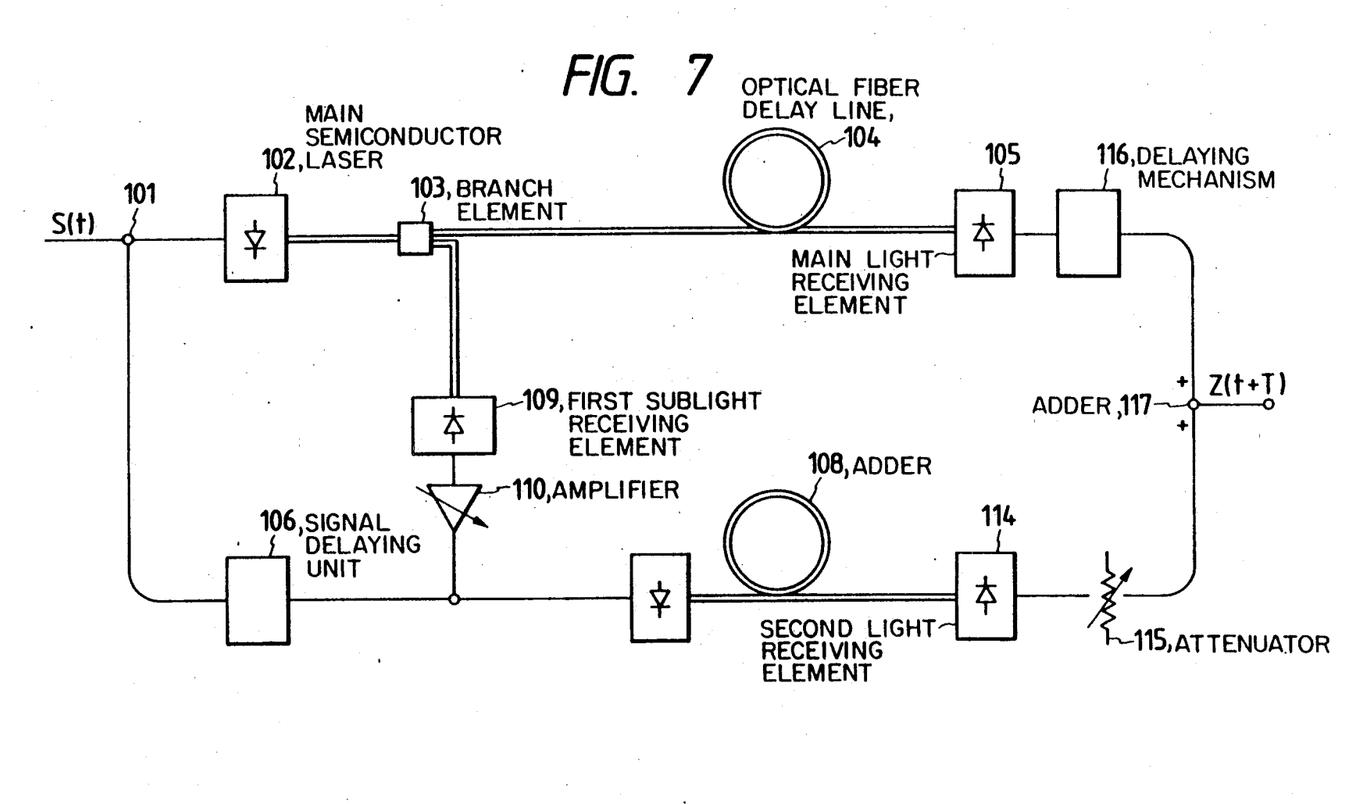
FIG. 7 is a diagram for showing a model system, used for investigating the delay time of signals in the optical communication system in FIG. 6.

FIG. 7 shows a model system for investigating the delay adjustment range and the delay accuracy of the delaying mechanism 106, 116a, 116b used in the optical communication system of the second embodiment.

In FIG. 7, elements corresponding to elements in FIG. 6 have identical reference designations. Further, the delaying mechanisms 116a, 116b of the second embodiment are labelled as a delaying mechanism 116.

Assuming the time function of the input signal is S(t) and the delay time T from input to output is T, the output signal is represented by Z(t+T).

Here, we assume that the input current x into the main semiconductor laser 102 and the output $O_1(x)$ thereof and the input x into the subsemiconductor laser 112 and the output $O_2(x)$ thereof are as follows:

$$O_1(x) = P_1(x - Ith_1) - Q_1(x - Ith_1)^2$$

$$O_2(x) = P_2(x - Ith_2) - Q_2(x - Ith_2)^2$$

where $P_1$, $P_2$, $Q_1$, and $Q_2$ are characteristic parameters and $Ith_1$ and $Ith_2$ are threshold currents.

It is assumed that the branch ratio of the branch element 103 is 1:1, the respective output Y that corresponds to the optical inputs x to the main light receiving element 105, the first sublight receiving element 109, and the second sublight receiving element 210, respectively, are $$Y_1 = r_1 x$$

$$Y_2 = r_2 x$$

$$Y_3 = r_3 x,$$

and the attenuation of the main optical fiber line 104 and the suboptical fiber line 113, $f_1$ and $f_2$, respectively.

We also assume that the delay time by the delaying mechanism 105 is $\tau_1$ and the delay time by the delaying mechanism 116 is $\tau_2$. The relation of the output Y4 of the amplifier 110 and the input x to the amplifier 110 is $Y4 = b_1 x$ and the relation of the input x to the attenuator 115 and the output Y5 of the attenuator is $Y5 = b_2 x$. For a given input S(t), a current $I_1 + k_1(t)$ flows into the main semiconductor laser 102 and a current $I_2 + k_2(t)$ into the branch line 130, then an output $Z = (t+T)$ is obtained.

Relating the respective constants $b_1$, $b_2$, $k_1$, $k_2$, $P_1$, $P_2$, $f_1$, $f_2$, $r_1$, $r_2$, and $r_3$ as follows:

$$b_1 = 1/(p_1 \times r_1)$$

$$b_2 = (f_1 \times P_1 \times r_2)/(f_2 \times P_2 \times r_1 \times r_3)$$

$$k_2 = k_1/2$$

and the output function Z(t+T) is obtained as follows:

$$Z(t + T) = (f_1 \times P_1 \times r_2/r_1) \cdot \quad (2)$$
$$\{I_2 - Ith_2 + k_2 S(t - \Delta\tau_1)\} - \{f_1 \times P_1 \times Q_2 \times r_2/P_2/r_1\} \times$$
$$\{I_2 - Ith_2 - (I_1 - Ith_1)/2\}_2 + \{f_1 \times k_1 \times P_1 \times r_2 \div 2\} \times$$
$$\{S(t - \Delta\tau) - S(t)\} + \{f_1 \times k_1 \times Q_1 \times r_2/2\} \times$$
$$[\{S(t)\}_2 - \{S(t - \Delta\tau_2)\}_2]$$

In the above equation (2), $$\Delta\tau_1 = T_3 - (T_1 + T_2)$$

$$\Delta\tau_2 = T_4 - (T_2 + T_5)$$

$$T = T_1 + T_2 + T_5$$

where
- $T_1$: delay time from the branch operational circuit 101a to the branch element 103,
- $T_2$: delay time from the branch element 103 to the substractor 132,
- $T_3$: delay time from the output of the branch operational circuit 101 to the subtractor 132,
- $T_4$: delay time from the branch element 103 to the adder 117,
- $T_5$: delay time from the subtractor 132 to the adder 117

Figure 8:
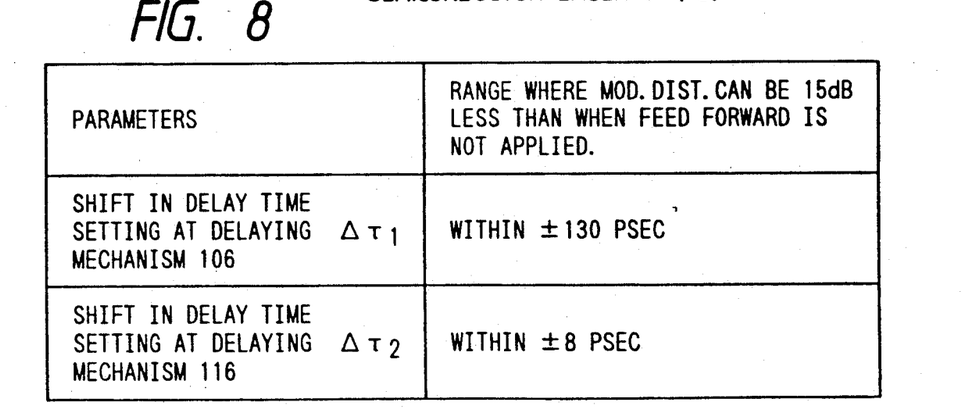
FIG. 8 is a table for showing the result of investigation of the model system in FIG. 7.

The investigation of the output signal with respect to changes in delay times $\Delta\tau_1$, $\Delta\tau_2$ of the delaying mechanisms 106, 116, respectively produced the result shown in a table in FIG. 8. As can be seen from the table, allowable delay accuracy of the delaying mechanism 116 is ±8 picoseconds which revealed that the delay time must be aligned within this allowable range.

The following is the investigation of the range of delay time adjustment of the delaying mechanisms 106, 116.

In the delaying mechanism 106, the signal through the delaying line 130 needs to be delayed by the drive delay time of the main light emitting element 102 plus the response time of the first sublight receiving element 109 and the amplifier 110, and the amount of delay time is only about 2 nanoseconds.

On the other hand, in the delaying mechanism 116, the signal must be delayed by the amount of the delay time due to the response time of the adder 108 and the amplifier 111, the drive delay time of the subsemiconductor laser 112, the overall delay time due to the response time of the second sublight receiving element 114 and the delay time due to the response time of the attenuator 115, and the relative signal delay time of the main optical fiber line 104 and the suboptical fiber line 113. Of the respective delay times, the largest are the relative signal delay time of the main optical fiber line 104 and the suboptical fiber line 113. Even if two optical fibers are used within a signal optical fiber cable, a signal transmission over, for example, 20 km, causes the transmission time difference of up to about 200 nanoseconds for different strand rates and up to above several nanoseconds for different wavelengths, depending on the signal transmission system.

From the above-described investigation, it is required of the delaying mechanism 106 that its performance is of a maximum range of adjustment of 2 nanoseconds and a delay accuracy of ±130 picoseconds. It is easy for one skilled in the art to arrange a delaying mechanism in the form of an electrical circuit having such performance.

In the meantime, it is required of the delaying mechanism 116 that its performance is of a maximum range of adjustment of 200 nanoseconds and a delay accuracy of ±8 picoseconds. A delay mechanism of adjustment and a high accuracy is difficult to realize by simply cascading conventional electrical delay circuits.

Thus from the described investigation, the delaying mechanism is made up of two delaying mechanisms 116a and 116b. 116a is a mechanism that a small delay accuracy but a wide range of adjustment while 116b is a mechanism that has a small range of adjustment for delay time and a high delay accuracy. By this arrangement, the coarse adjustment is performed by the delaying mechanism 116a and the fine adjustment is performed by the delay mechanism 116a, thereby enabling the required accurate adjustment of delay time over a wide range.

An electrical delaying circuit may be used as delaying mechanism for coarse adjustment but an optical fiber may also be used as mentioned previously if the delaying is to be performed on the optical signals. When the optical fiber is used, a signal delay of 200 nanoseconds is equivalent to the time required for the optical signal to travel a distance of 41 meters.

Therefore, a delay time of 0.5 nanoseconds corresponds to the time required for the optical signal to travel through an optical fiber of 0.1 meter. Since it is rather easy to cut the optical fiber of several tens of meters to an accuracy of 0.1 meter, it is easy and also simple to construct a delaying mechanism (corresponds to the optical fiber delay line 116a of the second embodiment) for performing coarse adjustment. If the delay line is constructed of the optical fiber, there is an advantage that the adjustment of accuracy within a tolerance can be performed very easily by adjusting the delay time using the optical pulse testing device. The delaying mechanism for fine adjustment (corresponding to the electrical circuit 116b of the second embodiment) can be constructed of electrical circuit components without difficulty.

Constructing the coarse delaying mechanism by winding a long optical fiber or an electrically conductive wire in the form of a coil or constructing the same using multiple stages of electrical delay circuits does not permit a delaying mechanism of a small size. Thus providing the delaying mechanism in the transmitter station side as described above will permit a receiving station to be miniaturized as compared to the prior art discussed earlier. In the above-mentioned embodiments, the delaying mechanism for fine adjustment is constructed of an electrical circuit and is disposed immediately before the adder 117 in the receiving station, thereby allowing fine adjustment to be performed. Thereby miniaturization of the receiving station and fine adjustment with a high degree of accuracy are made possible. With the optical communication system according to the above-described embodiment, the main semiconductor laser 102, the subsemiconductor laser 112, the main light emitting element 105, the first and second sublight receiving elements 109, 114, the optical fiber lines 104, 113, and the transmitted signals were constructed of those used for the first and second embodiments to build a trial model system.

The signal delay adjustment for the main signals that is transmitted over the main optical fiber line 104 and the correction signal that is transmitted over the suboptical fiber line 113 was performed in the following manner.

First, when inputting a pulse signal through the input terminal 101, the time difference between the optical signal input into the main fiber line 104 and the optical signal input into the suboptical fiber line 113 was measured and a time difference of $D_1$(2.8 nanoseconds) was obtained. Then an optical pulse signal of a wavelength of 1310 nanometers is input into the OTDR (pulse light testing device) through the input terminals of the main optical fiber line 104 and the suboptical fiber line 113, the lengths of the light paths to the Fresnel reflection at the outputs of the main optical fiber line 104 and the suboptical fiber line 113 were measured, the relative time difference $D_2$(30.8 nanoseconds) between the main and suboptical fiber lines 104, 113 was measured. A delay time $D_3$(0.2 nanoseconds) due to the wavelength dispersion characteristic of the main and suboptical fiber lines 104, 113 and the difference in oscillation wavelengths of the main and subsemiconductor lasers 102, 112 was calculated. Then, the sum of these three delay times, i.e., $D_1+D_2+D_3=33.8$ nanoseconds, was divided by the delay time $F=4.88$ nanoseconds per meter of the optical fiber to determine the required length of the delay line 116a. The length of the optical fiber delay line 116a thus determined was 6.95 meters.

An optical fiber was cut to this length and was connected as the optical fiber delay line shown in FIG. 6 to the input terminal of the main optical fiber lines 104. Thereafter, the difference in delay time between the main signal and the correction signal was measured by again applying the optical pulse signal to the input terminals 101 before the adder 117, the measurement was 0.8 nanoseconds which was again adjusted by the electrical delay circuit 116b. With the delay time thus adjusted, the modulation distortion was 18.5 dB less than that when the feedforward system was not used.

The embodiments described are only exemplary and a variety of modifications may be made.

For example, while separate optical fibers, i.e., the main optical fiber line and the suboptical fiber line are used to form the optical fiber line through which the main signal and the correction signal are transmitted, a single optical fiber line can be shared by the main and sublines. In which case, the main signal and the correction signal are of wavelengths different from each other and these signals are synthesized by the synthesizer to subsequently feed the optical fiber line. The synthesized signal, which is received at the receiving station, is branched by a branching filter and the branched optical signals are converted into electrical signals, subsequently by superimposition.

In an optical communication system and optical communication method according to the invention, as described previously, when the modulation distortion is to be suppressed by utilizing the optical feedforward method in transmitting the analog signal through the intensity modulation, the characteristic parameters of the semiconductor laser used for generating the correction signal are monitored whenever necessary. The operating parameters, the optical feedforward, are corrected on the basis of the characteristic parameters measured. Thus the modulation distortion developed during transmission can be suppressed to a very small amount at all times.

Therefore the invention is effective in transmitting picture signals in, for example, CATV.

Further, in the optical communication system according to the present invention, as described previously, when the modulation distortion is to be suppressed by utilizing the optical feedforward method in transmitting the analog signal through intensity modulation, the combined usage of a delaying mechanism in which delay accuracy is not so high but the range of delay adjustment is wide and a delaying mechanism in which the range of delay adjustment is narrow but delay accuracy is high, permits a highly accurate and wide range of delay time control as well as enables suppression of the modulation distortion developed during the intensity modulation to a very low level.

Therefore the invention is extremely effective in transmitting the picture signals in, for example, CATV.

What is claimed is:

1. An optical communication system for directly intensity-modulating an optical signal in response to an analog signal and transmitting the intensity-modulated optical signal, said optical communication system comprising:

means for generating said analog signal;

first branching means for branching said analog signal into a first signal and a second signal;

main light emitting means for intensity-modulating an optical signal with said first signal and outputting the modulated optical signal;

second branching means for branching said modulated optical signal output by said main light emitting means into a first optical signal and a second optical signal;

first light receiving means for generating a first electrical signal in accordance with said first optical signal;

second light receiving means for generating a second electrical signal in accordance with said second optical signal;

comparison means for comparing said first electrical signal and said second signal of said analog signal, and outputting a comparison electrical signal;

auxiliary light emitting means for emitting a light in accordance with said comparison electrical signal from said comparison means;

third light receiving means for producing an electrical signal in accordance with said light from said auxiliary light emitting means;

superimposing means for superimposing the electrical signals from said second and third light receiving means; and adjusting means connected between said auxiliary light emitting means and said analog signal generating means for calculating parameters of an input/output characteristic of said auxiliary light emitting means to adjust operating parameters in said optical communication system, said parameters being calculated via a predetermined mathematical algorithm, said adjusting means comprising:

sweep means for sweeping an input current into said auxiliary light emitting means;

fourth light receiving means for receiving said optical signal emitted from said auxiliary light emitting means and for generating a current in accordance with said optical signal; and arithmetic operating means connected to said fourth light receiving means and said sweep means for calculating parameters of an input/output characteristic of said auxiliary light emitting means.

2. An optical communication system according to claim 1, wherein said parameters of the input/output characteristic are a threshold current and a slope efficiency.

3. An optical communication system for directly intensity-modulating an optical signal with an analog signal and transmitting the intensity-modulated optical signal, said optical communication system comprising:

means for generating said analog signal;

first branching means for branching said analog signal into a first signal and a second signal;

main light emitting means for intensity-modulating an optical signal with said first signal and outputting the modulated optical signal;

second branching means for branching said modulated optical signal output by said main light emitting means into a first optical signal and a second optical signal;

first light receiving means for generating an electrical signal in accordance with said first optical signal;

second light receiving means for generating an electrical signal in accordance with said second optical signal;

comparison means for comparing said electrical signal from said first light receiving means and said electrical signal from said second light receiving means, and outputting a comparison electrical signal;

auxiliary light emitting means for emitting an optical signal in accordance with said comparison electrical signal from said comparison means; and adjusting means connected between said auxiliary light emitting means and said analog signal generating means for calculating parameters of an input/output characteristic of said auxiliary light emitting means to adjust operating parameters in said optical communication system, said parameters being calculated via a predetermined mathematical algorithm, said adjusting means comprising:
sweep means for sweeping an input current into said auxiliary light emitting means;
fourth light receiving means for receiving said optical signal emitted from said auxiliary light emitting means and for generating a current in accordance with said optical signal; and
arithmetic operating means connected to said fourth light receiving means and said sweep means for calculating parameters of an input/output characteristic of said auxiliary light emitting means.

4. An optical communication system according to claim 3, wherein said parameters of the input/output characteristic are a threshold current and a slope efficiency.

5. An optical communication method using an optical communication system in which an analog signal is optically transmitted by directly intensity-modulating an optical signal by the analog signal, said method comprising the steps of:
producing the optical signal using a main light emitting means;
converting a first part of the optical signal into a first electrical signal;
converting a second part of the optical signal into a second electrical signal;
comparing said first electrical signal with said analog signal and outputting a comparison result;
intensity-modulating an optical signal with the comparison result and adding the intensity-modulated optical signal with said comparison result to part of the output of said main light emitting means;
performing feed forward processing of the analog signal, wherein said feed forward processing is based on a predetermined mathematical model;
measuring characteristic parameters of a correction light emitting means consisting essentially of an auxiliary light emitting means, and substituting current operating parameters of said optical communication system for the measured characteristic parameters, said measuring and substituting steps comprising:
sweeping an input current into said correcting light emitting means;
generating a current in accordance with the optical signal; and
calculating parameters of an input/output characteristic of said correcting light emitting means;
converting the optical signal of said correction light emitting means into a third electrical signal; and
superimposing the second electrical signal and the third electrical signal.

6. An optical communication system for directly intensity-modulating an optical signal with an analog signal and transmitting the intensity-modulated optical signal, comprising:
first branching means for branching said analog signal into a first signal and a second signal;
main light emitting means for intensity-modulating the optical signal with said first signal and outputting a modulated optical signal;
second branching means for branching said modulated optical signal output by said main light emitting means into a first optical signal and a second optical signal;
a first optical signal delaying mechanism connected to said second branching means for delaying said first optical signal to a first predetermined amount having delay accuracy within a predetermined range, said optical signal delaying mechanism comprising an optical fiber line having a predetermined length;
a first light receiving means for generating a first electrical signal in accordance with said second optical signal,
second light receiving means for generating a second electrical signal in accordance with the delayed first optical signal from said first optical signal delaying mechanism;
comparison means for comparing said first electrical signal and said second electrical signal, and outputting a comparison electrical signal;
auxiliary light emitting means for emitting a third optical signal in accordance with said comparison electrical signal from said comparison means;
third light receiving means for producing a third electrical signal in accordance with the third optical signal from said auxiliary light emitting means;
an electrical signal delaying mechanism for delaying the second electrical signal to a second predetermined amount higher than said first predetermined amount, said electrical signal delaying mechanism being constructed of an electrical delay circuit and outputting a fourth electrical signal; and
superimposing means for superimposing said third electrical signal and said fourth electrical signal.

7. An optical communication system according to claim 6, wherein said optical signal delaying mechanism is provided at a transmitting side of the optical communication system.

8. An optical communication system according to claim 6, wherein said first predetermined delay accuracy is 130 picoseconds of the first predetermined amount.

* * * * *